United States Patent Office 2,713,030
Patented July 12, 1955

2,713,030

DRILLING MUD ADDITION AGENT

Edwin H. Brink, Laurel, and Harold O. Walker, Ellisville, Miss., assignors to Masonite Corporation, Laurel, Miss., a corporation of Delaware No Drawing. Application May 17, 1952,
Serial No. 288,536

6 Claims. (Cl. 252—8.5)

The present invention relates to drilling mud compositions and relates more particularly to oil well drilling muds characterized by improved viscosity and gel strength. Even more particularly, the invention relates to bentonitic drilling mud composition stabilized against viscosity and gel strength fluctuations by the addition thereto of an alkali metal molecularly dehydrated phosphate and a carbohydrate mixture derived from thermohydrolytically treated lignocellulose.

In drilling deep wells, and particularly in drilling oil wells where the depth to be attained may range from about 5,000 to 12,000 or more feet, the drilling operation is frequently faced with serious problems due to the characteristics of the various strata through which the well extends, as well as to temperature and pressure variables and also contaminants which enter into the drilling mud compositions. The art has long recognized that all of these factors play important parts in changing the characteristics of the mud employed. For these reasons, those skilled in the art have employed a variety of chemical compositions in order to impart to the drilling mud those characteristics which are desired.

Chief among those properties which are desirably maintained in the muds are stability of both viscosity and gel strength. The art has heretofore employed for this purpose various alkali metal molecularly dehydrated phosphates such as sodium acid pyrophosphate, sodium hexa metaphosphate, sodium tetraphosphate, sodium metaphosphate, tetrasodium pyrophosphate, and the like phosphates which are characterized by their ability to revert to the orthophosphate form in the presence of water. All of these chemical compounds have been employed to some extent, although for reasons of economy and desirable results, the amount of sodium acid pyrophosphate employed has been much greater than that of the other phosphates. Also, the use of these phosphate compositions has been accompanied in many instances by other chemical compositions such as, for example, quebracho, gellic acid, caustic soda, soda ash, sodium chloride, sodium bicarbonate, lime, and the like chemicals which aid in imparting to the drilling mud composition the desired physical properties. Recently, chemical compounds containing nitrogen have been employed as mud thinning agents and these compositions include urea, thiourea, dicyandiamide, and substituted ureas, thioureas, guanylureas, and the like compositions.

In the commercially employed clay-water drilling mud systems, the use of phosphates alone is primarily restricted to wells which are drilled through thick clay and shale formations. Since these strata are not the only ones usually encountered, it has been common practice to employ both polyphosphates and quebracho extracts, i. e., sodium tannate to control viscosity and gel strength. In this respect, the mud composition must be one which retains its relatively low viscosity over a long period of time and, sometimes, at elevated temperatures. Moreover, the gel strength of the mud should not increase appreciably over a similar aging period. Sodium acid pyrophosphate together with quebracho extract in amounts ranging from about 0.05% to about 2.5% based on the volume of mud have been found to give fairly satisfactory results and have, accordingly, been extensively used by the oil well drilling industry.

The present invention is directed to the discovery that the water soluble carbohydrate mixture obtained from thermally hydrolyzed lignocellulose may be employed in conjunction with alkali metal molecularly dehydrated phosphates to give greatly improved viscosity and gel strength stability to the ordinarily employed clay-water drilling mud compositions.

One of the outstanding features of the present invention resides in the fact that the carbohydrate mixture employed is inexpensive and its use therefore presents a decided commercial advantage over the use of quebracho and other tannin and tannin-like agents.

Another advantage of the invention stems from the fact that the carbohydrate mixture employed actually increases the heat and/or aging stability of the above described class of alkali metal phosphates in drilling mud compositions and, as a consequence thereof, improves the stability of the drilling mud composition. Other advantages of the invention will become apparent from the following detailed description thereof.

It has been discovered that carbohydrate mixtures derived from thermohydrolytically treated lignocellulose and consisting mainly of arabinose, mannose, galactose, glucose, and xylose sugar units and their precursors may be used according to the invention. Such carbohydrate mixtures ordinarily comprise the water soluble portion of lignocellulose material which has been subjected to thermal hydrolysis at elevated temperatures and pressures. They may also be obtained by the ordinary acid hydrolysis of wood or woody material as well as by saccharification of such materials.

One of the outstanding methods of obtaining the water soluble oligosaccharide mixture of the present invention, particularly from the viewpoint of commercial availability of raw material, is that described in United States Patent No. 1,824,221, issued September 22, 1931, to William H. Mason. In that invention, chips or small pieces of wood of trees and woody materials of corn stalks, cane, and other vegetable growths are first charged into a closed chamber. Thereafter the chips are subjected to pressure of about 200–1200 p. s. i. and a temperature of about 200° C.–300° C. for approximately 30 minutes to 5 seconds respectively, in the presence of steam, and the material is then discharged from the chamber through a constricted discharge means therein into a zone of lower pressure (preferably atmospheric pressure), thereby exploding the wood chips into comparatively finely divided elongated fibers and bundles of fiber. Under this treatment the wood undergoes hydrolysis, and water-insoluble and readily hydrolyzable constituents thereof are rendered soluble or dispersible or suspendible in water. The water soluble portion ordinarily contains about 60–80% of pentosans and hexosans, 5–15% of non-sugar carbohydrates, 5–25% of lignin, and 2–8% of gums. Relatively concentrated aqueous solutions of these solubles are known in the trade as Masonex while the dried material is known as Masonoid.

Small amounts of the above described oligosaccharide mixtures have a definite effect on the viscosity and gel strength of bentonitic drilling muds and this feature is described and claimed in copending application of James M. Fuller, Serial No. 286,630, filed May 7, 1952. It has now been found that the ability of these oligosaccharides to lower mud viscosity and gel strength is greatly enhanced by the presence of a member of the above described class of alkali metal phosphates. It has also been found that the oligosaccharide mixture contributes heat stability to these phosphates. It is this combination of oligosaccharide mixture and alkali metal molecularly dehydrated phosphates to which the present invention is directed.

In preparing the novel drilling mud addition agents of the invention, the amount of oligosaccharide mixture which may be employed is within the range of about 50% to about 90% by weight of the addition agent, while the phosphate may range from about 10% to 50% by weight of the mixture. For example, about 80% of oligosaccharide mixture (Masonoid) may be mixed with 20% by weight of sodium tetraphosphate or tetrapotassium pyrophosphate to provide drilling mud addition agents having outstanding viscosity and gel strength control properties. Amounts of oligosaccharide in excess of about 90%, however, are not contemplated in the present invention since the correspondingly low content of phosphate does not provide the desired assistance. On the contrary, amounts of phosphate in excess of about 50% by weight of the addition agent tend to promote instability to heat and are therefore undesirable. The components may be mixed in dry condition or the phosphate may be added to the concentrated aqueous oligosaccharide, i. e. Masonex, and this composite may be brought to dry condition. Small amounts of the addition agent, on the order of about 0.0025% to about 0.2% based on the volume of mud, i. e. corresponding to about 0.0087 to about 0.7 pound addition agent per 42 gallon barrel of mud, will greatly lower the viscosity and gel strength of the mud and provide the desired stability therein. Subsequent heat treatment of the mud for great lengths of time does not substantially alter these properties of the mud so that, in the ordinary drilling operations which may extend over a period of several days or weeks, the mud remains in fluid condition and may be freely circulated throughout the system.

In addition to these desirable characteristics, it has also been found that salt contamination does not interfere with the reduced viscosity and gel strength of the mud system. For example, amounts of NaCl on the order of from about 0.25% to about 0.5% do not cause appreciable increase in either viscosity or gel strength. In a similar manner, in actual drilling practice, a mud system contaminated by relatively large quantities of lime retained its desired fluidity throughout the entire drilling operation.

The drilling mud addition agents of the present invention may be employed throughout the entire pH range ordinarily encountered in deep well drilling, extending from about neutrality, i. e. pH of about 6.8–6.9, to extreme alkalinity, i. e. pH of 12.0–12.4. Drilling muds treated with the novel addition agents have also retained their fluidity at temperatures ranging from 160° F. to 200° F. and at the elevated pressures which usually exist. The addition agents are also compatible with numerous other additive materials used in conjunction with drilling muds. For example, they may be employed together with varying amounts of resinous agents as well as with other sealing compositions such as cellulose fibers, lignocellulose fibers, and the like materials. Water loss of drilling mud containing the addition agents of the present invention is well within the limits prescribed by the industry and the filter cakes formed are desirably plastic and non-cracking.

The invention will be further illustrated by the following specific examples.

*Example 1*

Wyoming bentonite was slurried in water in the proportion of about 7.3 parts to 100 parts of distilled water. The slurry was stirred for 1.5 hours and then allowed to stand for 24 hours to reach equilibrium. Thereafter, 800 cc. samples were withdrawn and evaluated for viscosity and gel strength. In the following table, viscosity values were obtained with a Stormer viscosimeter. Measurements are given nn centipoises at 600 R. P. M. Gel strength was also evaluated with the same viscosimeter. The physical data was obtained according to the procedure described in the American Petroleum Institute Bulletin entitled "API-RP 29 (3rd edition)" with the exception that tests were made immediately after addition of the Masonoid-sodium acid pyrophosphate mixture and also after an incubation period of 24 hours at 160° F.

[50% Masonoid—50% sodium acid pyrophosphate.]

INITIAL RESULTS

| | | | | | |
|---|---|---|---|---|---|
| Percent Addition Agent by volume | None | 0.005 | 0.01 | 0.04 | 0.2 |
| Lbs. Addition Agent per barrel mud | None | 0.0175 | 0.035 | 0.14 | 0.7 |
| Viscosity, 600 R. P. M., cps | 40 | 33 | 30 | 28 | 22 |
| Gel Strength, Initial, Gms | 14 | 6 | 4 | <4 | <4 |
| Gel Strength, 10 Mins., Gms | 54 | 22 | 7 | <4 | <4 |

AFTER 24 HR. AT 160° F.

| | | | | | |
|---|---|---|---|---|---|
| Viscosity, 600 R. P. M., cps | 54 | 43 | 39 | 37 | 34 |
| Gel Strength, Initial, Gms | 24 | 11 | 5 | <4 | <4 |
| Gel Strength, 10 Min., Gms | 74 | 46 | 34 | 5 | <4 |

*Example 2*

The procedure of Example 1 was repeated employing an addition agent mixture consisting of 90% Masonoid and 10% sodium acid pyrophosphate. Test results are given below.

[90% Masonoid—10% sodium acid pyrophosphate.]

INITIAL RESULTS

| | | | | | |
|---|---|---|---|---|---|
| Percent Addition Agent by volume | None | 0.005 | 0.01 | 0.04 | 0.2 |
| Lbs. Addition Agent per barrel mud | None | 0.0175 | 0.035 | 0.14 | 0.7 |
| Viscosity, 600 R. P. M., cps | 40 | 32 | 30 | 23 | 21 |
| Gel Strength, Initial, Gms | 14 | 7 | 6 | <4 | <4 |
| Gel Strength, 10 Min., Gms | 54 | 50 | 44 | <4 | <4 |

AFTER 24 HRS. AT 160° F.

| | | | | | |
|---|---|---|---|---|---|
| Viscosity, 600 R. P. M., cps | 54 | 38 | 34 | 28 | 27 |
| Gel Strength, Initial, Gms | 24 | 8 | 6 | 4 | <4 |
| Gel Strength, 10 Min., Gms | 47 | 49 | 34 | 12 | <4 |

*Example 3*

A typical drilling mud was prepared as in Example 1 with the exception that 0.25% of NaCl was added thereto as a contaminant. Test results are given below.

INITIAL VISCOSITY, CENTIPOISES AT 600 R. P. M.

| Percent Addition Agent by volume | Blank | 0.25% NaCl | 0.0025 | 0.005 | 0.01 | 0.02 |
|---|---|---|---|---|---|---|
| Lbs. Addition Agent per barrel mud | | | 0.0087 | 0.0175 | 0.035 | 0.07 |
| 80% Masonoid+20% S. A. P. P | 30 | 80 | 62 | 54 | 43 | 32 |
| Quebracho—NaOH | 30 | 80 | 59 | 60 | 54 | 46 |

VISCOSITY AFTER 24 HR. AT 160° F., CENTIPOISES AT 600 R. P. M.

| | | | | | | |
|---|---|---|---|---|---|---|
| 80% Masonoid+20% S. A. P. P | 35 | 63 | 50 | 45 | 38 | 32 |
| Quebracho+NaOH | 35 | 64 | 59 | 54 | 51 | 43 |

INITIAL GEL STRENGTH, GRAMS

| | | | | | | |
|---|---|---|---|---|---|---|
| 80% Masonoid+20% S. A. P. P | 14 | 140 | 101 | 89 | 74 | 49 |
| Quebracho+NaOH | 14 | 140 | 88 | 91 | 83 | 72 |

GEL STRENGTH AFTER 24 HR. AT 160° F., GRAMS

| | | | | | | |
|---|---|---|---|---|---|---|
| 80% Masonoid+20% S. A. P. P | 54 | 147 | 117 | 101 | 79 | 62 |
| Quebracho+NaOH | 54 | 148 | 124 | 104 | 87 | 74 |

Example 4

The procedure of Example 3 was repeated except that 0.5% of NaCl contaminant was added. Test results are given below.

INITIAL VISCOSITY, CENTIPOISES AT 600 R. P. M.

| Percent Addition Agent by volume | Blank | 0.5% NaCl | 0.0025 | 0.005 | 0.01 | 0.02 |
|---|---|---|---|---|---|---|
| Lbs. Addition Agent per barrel mud | | | 0.0087 | 0.0175 | 0.035 | 0.07 |
| 80% Masonoid+20% S. A. P. P | 37 | 103 | 87 | 78 | 67 | 51 |
| Quebracho+NaOH | 37 | 103 | 92 | 88 | 80 | 78 |

VISCOSITY AFTER 24 HR. AT 160° F., 600 R. P. M., CPS

| 80% Masonoid+20% S. A. P. P | 43 | 82 | 83 | 75 | 62 | 52 |
| Quebracho+NaOH | 43 | 82 | 84 | 78 | 71 | 60 |

INITIAL GEL STRENGTH, GRAMS

| 80% Masonoid+20% S. A. P. P | 16 | 150 | 115 | 106 | 96 | 74 |
| Quebracho+NaOH | 16 | 150 | 121 | 117 | 110 | 100 |

GEL STRENGTH AFTER 24 HR. AT 160° F., GRAMS

| 80% Masonoid+20% S. A. P. P | 69 | 156 | 105 | 100 | 112 | 102 |
| Quebracho+NaOH | 69 | 156 | 121 | 110 | 110 | 110 |

Example 5

The procedure of Example 1 was repeated except that the addition agent consisted of 80% Masonoid and 20% sodium tetraphosphate. Test results are given below.

[80% Masonoid—20% sodium tetraphosphate.]
INITIAL RESULTS

| Percent Addition Agent by volume | None | 0.0025 | 0.01 | 0.04 | 0.1 |
|---|---|---|---|---|---|
| Lbs. Addition Agent per barrel mud | None | 0.0087 | 0.035 | 0.14 | 0.35 |
| Viscosity, 600 R. P. M. (Cent.) | 39 | 35 | 33 | 28 | 25 |
| Gel Strength, Initial, Gms | 16 | 9 | 6 | 4 | 4 |
| Gel Strength, 10 Min., Gms | 59 | 54 | 49 | 34 | 12 |

AFTER 24 HR. AT 180° C.

| Viscosity, 600 R. P. M. (Cent.) | 56 | 53 | 43 | 37 | 29 |
| Gel Strength, Initial, Gms | 24 | 19 | 10 | 6 | 4 |
| Gel Strength, 10 Min., Gms | 78 | 69 | 54 | 54 | 21 |

Example 6

The procedure of Example 1 was repeated except that the addition agent consisted of 80% Masonoid and 20% tetra sodium pyrophosphate.

[80% Masonoid—20% tetra sodium pyrophosphate.]
INITIAL RESULTS

| Percent Addition Agent by volume | None | 0.0025 | 0.01 | 0.04 | 0.1 |
|---|---|---|---|---|---|
| Lbs. Addition Agent per barrel mud | None | 0.0087 | 0.035 | 0.14 | 0.35 |
| Viscosity, 600 R. P. M., cps | 39 | 38 | 32 | 26 | 25 |
| Gel Strength, Initial, Gms | 16 | 9 | 4 | 4 | 4 |
| Gel Strength, 10 Min., Gms | 59 | 49 | 34 | 11 | 4 |

AFTER 24 HR. AT 180° C.

| Viscosity, 600 R. P. M., cps | 56 | 47 | 42 | 35 | 29 |
| Gel Strength, Initial, Gms | 24 | 19 | 11 | 6 | 4 |
| Gel Strength, 10 Min., Gms | 78 | 64 | 54 | 30 | 9 |

Example 7

The procedure of Example 1 was repeated except that the addition agent consisted of 80% Masonoid and 20% tetra potassium pyrophosphate.

[80% Masonoid—20% tetra potassium pyrophosphate.]
INITIAL RESULTS

| Percent Addition Agent by volume | None | 0.0025 | 0.01 | 0.04 | 0.1 |
|---|---|---|---|---|---|
| Lbs. Addition Agent per barrel mud | None | 0.0087 | 0.035 | 0.14 | 0.35 |
| Viscosity, Centipoises at 600 R. P. M. | 39 | 36 | 31 | 27 | 25 |
| Gel Strength, Initial, Gms | 16 | 9 | 4 | 4 | 4 |
| Gel Strength, 10 Min., Gms | 54 | 44 | 32 | 11 | 4 |

AFTER 24 HR. AT 180° F.

| Viscosity, 600 R. P. M., cps | 54 | 48 | 42 | 37 | 30 |
| Gel Strength, Initial, Gms | 21 | 19 | 12 | 6 | 4 |
| Gel Strength, 10 Min., Gms | 79 | 56 | 39 | 29 | 14 |

Example 8

The procedure of Example 1 was repeated except that the addition agent consisted of 80% Masonoid and 20% sodium hexametaphosphate.

[80% Masonoid—20% sodium hexametaphosphate.]
INITIAL RESULTS

| Percent Addition Agent by volume | None | 0.0025 | 0.01 | 0.04 | 0.1 |
|---|---|---|---|---|---|
| Lbs. Addition Agent per barrel mud | None | 0.0087 | 0.035 | 0.14 | 0.35 |
| Viscosity, Centipoises at 600 R. P. M. | 39 | 32 | 27 | 25 | 22 |
| Gel Strength, Initial, Gms | 16 | 7 | 4 | 4 | 4 |
| Gel Strength, 10 Min., Gms | 54 | 49 | 39 | 24 | 9 |

AFTER AGING 24 HR. AT 180° F.

| Viscosity, Centipoises at 600 R. P. M. | 55 | 42 | 37 | 31 | 30 |
| Gel Strength, Initial, Gms | 24 | 21 | 9 | 4 | 4 |
| Gel Strength, 10 Min., Gms | 79 | 64 | 54 | 29 | 9 |

Example 9

The procedure of Example 1 was repeated, except that the addition agent consisted of 80% Masonoid and 20% sodium tripolyphosphate.

[80% Masonoid—20% sodium tripolyphosphate.]
INITIAL RESULTS

| Percent Addition Agent by volume | None | 0.0025 | 0.01 | 0.04 | 0.1 |
|---|---|---|---|---|---|
| Lbs. Addition Agent per barrel mud | None | 0.0087 | 0.035 | 0.14 | 0.35 |
| Viscosity, Centipoises at 600 R. P. M. | 40 | 33 | 29 | 28 | 25 |
| Gel Strength, Initial, Gms | 16 | 9 | 5 | 4 | 4 |
| Gel Strength, 10 Min., Gms | 54 | 54 | 44 | 24 | 14 |

AFTER AGING 24 HR. AT 180° F.

| Viscosity, Centipoises at 600 R. P. M. | 56 | 46 | 41 | 32 | 28 |
| Gel Strength, Initial, Gms | 21 | 19 | 11 | 4 | 4 |
| Gel Strength, 10 Min., Gms | 78 | 74 | 59 | 29 | 16 |

Example 10

The procedure of Example 1 was repeated except that the addition agent consisted of 80% Masonoid and 20% sodium metaphosphate.

[80% Masonoid—20% sodium metaphosphate.]
INITIAL RESULTS

| Percent Addition Agent by volume | None | 0.0025 | 0.01 | 0.04 | 0.1 |
|---|---|---|---|---|---|
| Lbs. Addition Agent per barrel mud | None | 0.0087 | 0.035 | 0.14 | 0.35 |
| Viscosity, Centipoises at 600 R. P. M. | 39 | 39 | 39 | 39 | 32 |
| Gel Strength, Initial, Gms | 16 | 16 | 12 | 9 | 5 |
| Gel Strength, 10 Min., Gms | 54 | 52 | 49 | 39 | 31 |

AFTER 24 HR. AT 180° F.

| Viscosity, Centipoises at 600 R. P. M. | 54 | 48 | 43 | 33 | 27 |
|---|---|---|---|---|---|
| Gel Strength, Initial, Gms. | 21 | 16 | 11 | 4 | 4 |
| Gel Strength, 10 Min., Gms. | 79 | 59 | 42 | 24 | 16 |

From the foregoing description and illustrative examples it will be seen that the oligosaccharide-alkali metal phosphate mixtures of the present invention comprise highly desirable drilling mud addition agents. Muds treated therewith are characterized by stabilized low viscosities and gel strengths. In fact, the novel addition agents exhibit improved characteristics when compared with quebracho which is the agent usually employed by the industry. Drilling muds treated with the novel agents are unaffected by salt contamination and are equally effective in the presence of lime and over a wide pH range.

We claim:

1. A drilling mud addition agent consisting essentially of from about 10% to about 50% by weight of an alkali metal molecularly dehydrated phosphate and from about 90% to about 50% by weight of an oligossaccharide mixture composed of arabinose, mannose, galactose, glucose, and xylose sugar units, said oligosaccharide mixture consisting of the water-soluble portion of lignocellulose material which has been subjected to thermal hydrolysis and which consist primarily of pentosans and hexosans.

2. A drilling mud addition agent consisting essentially of from about 10% to about 50% by weight of sodium acid pyrophosphate and from about 90% to about 50% by weight of an oligossacharide mixture composed of arabinose, mannose, galactose, glucose, and xylose sugar units, said oligosaccharide mixture consisting of the water-soluble portion of lignocellulose material which has been subjected to thermal hydrolysis and which consists primarily of pentosans and hexosans.

3. A drilling mud addition agent consisting essentially of from about 10% to about 50% by weight of sodium tetraphosphate and from about 90% to about 50% by weight of an oligosaccharide mixture composed of arabinose, mannose, galactose, glucose, and xylose sugar units, said oligosaccharide mixture consisting of the water-soluble portion of lignocellulose material which has been subjected to thermal hydrolysis and which consists primarily of pentosans and hexosans.

4. A drilling mud addition agent consisting essentially of from about 10% to about 50% by weight of tetra sodium pyrophosphate and from about 90% to about 50% by weight of an oligosaccharide mixture composed of arabinose, mannose, galactose, glucose, and xylose sugar units, said oligosaccharide mixture consisting of the water-soluble portion of lignocellulose material which has been subjected to thermal hydrolysis and which consists primarily of pentosans and hexosans.

5. A drilling mud addition agent consisting essentially of from about 10% to about 50% by weight of sodium hexametaphosphate and from about 90% to about 50% by weight of an oligosaccharide mixture composed of arabinose, mannose, galactose, glucose, and xylose sugar units, said oligosaccharide mixture consisting of the water-soluble portion of lignocellulose material which has been subjected to thermal hydrolysis and which consists primarily of pentosans and hexosans.

6. A drilling mud addition agent consisting essentially of from about 10% to about 50% by weight of sodium tripolyphosphate and from about 90% to about 50% by weight of an oligossacharide mixture composed of arabinose, mannose, galactose, glucose, and xylose sugar units, said oligosaccharide mixture consisting of the water-soluble portion of lignocellulose material which has been subjected to thermal hydrolysis and which consists primarily of pentosans and hexosans.

References Cited in the file of this patent

UNITED STATES PATENTS

| 2,207,348 | Jones et al. | July 9, 1940 |
| 2,212,108 | Zacher | Aug. 20, 1940 |
| 2,337,296 | Kennedy et al. | Dec. 21, 1943 |
| 2,360,327 | Bailey et al. | Oct. 17, 1944 |
| 2,364,434 | Foster | Dec. 4, 1944 |
| 2,491,436 | Barnes | Dec. 13, 1949 |
| 2,518,439 | Fischer et al. | Aug. 15, 1950 |